(12) United States Patent
Woo et al.

(10) Patent No.: US 10,664,948 B2
(45) Date of Patent: May 26, 2020

(54) METHOD AND APPARATUS FOR PROCESSING OMNI-DIRECTIONAL IMAGE

(71) Applicant: Samsung Electronics Co., Ltd., Gyeonggi-do (KR)

(72) Inventors: Ji-Hwan Woo, Seoul (KR); Byeong-Doo Choi, Gyeonggi-do (KR); Eric Yip, Seoul (KR)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 16/007,608

(22) Filed: Jun. 13, 2018

(65) Prior Publication Data

US 2018/0365798 A1 Dec. 20, 2018

Related U.S. Application Data

(60) Provisional application No. 62/520,192, filed on Jun. 15, 2017.

(30) Foreign Application Priority Data

Jan. 10, 2018 (KR) .......................... 10-2018-0003502

(51) Int. Cl.
*G06T 15/20* (2011.01)
*G06T 19/00* (2011.01)
(Continued)

(52) U.S. Cl.
CPC ....... *G06T 3/0062* (2013.01); *H04N 5/23238* (2013.01); *H04N 5/247* (2013.01)

(58) Field of Classification Search
CPC ........ G06T 15/205; G06T 2207/30244; H04N 21/21805; H04N 5/2259; H04N 5/23238
See application file for complete search history.

(56) References Cited

U.S. PATENT DOCUMENTS 10,388,025 B2\* 8/2019 Mollis .................... G06T 7/337
2013/0071012 A1 3/2013 Leichsenring et al.
(Continued)

FOREIGN PATENT DOCUMENTS

KR 1020170017700 2/2017

OTHER PUBLICATIONS

Sarthak Pathak et al., "Dense 3D Reconstruction from Two Spherical Images via Optical Flow-Based Equirectangular Epipolar Rectification", IEEE International Conference on Imaging Systems and Techniques (IST), Oct. 6, 2016, 6 pages.

(Continued)

*Primary Examiner* — Alison Slater
(74) *Attorney, Agent, or Firm* — The Farrell Law Firm, P.C.

(57) ABSTRACT

A method and apparatus are provided for processing information about an omni-directional image. The method includes generating a first two-dimensional (2D) image projected from a first omni-directional image, by setting points on the first omni-directional image, which intersect a straight line passing through a first position that is a center of the first omni-directional image and a second position that is a center of a second omni-directional image, to a first pole and a second pole, generating a second 2D image projected from the second omni-directional image, by setting points on the second omni-directional image, which intersect the straight line passing through the first position and the second position, to a third pole and a fourth pole, and generating a third 2D image corresponding to a 2D image projected from a third omni-directional image centered in a third position between the first position and the second position, based on the first 2D image and the second 2D image.

20 Claims, 8 Drawing Sheets

(51) Int. Cl.
　　　*G06T 3/00*　　　　(2006.01)
　　　*H04N 5/247*　　　(2006.01)
　　　*H04N 5/232*　　　(2006.01)

(56)　　　　　　　References Cited

U.S. PATENT DOCUMENTS

2018/0278916 A1　　9/2018　Kim et al.
2018/0374192 A1*　12/2018　Kunkel ................. G06T 15/205

OTHER PUBLICATIONS

Yun-Suk Kang et al., "Stereo Image Rectification for Simple Panoramic Image Generation", ResearchGate, Jan. 4, 2016, 7 pages.
Guo-Yu Lin et al., "A Robust Epipolar Rectification Method of Stereo Pairs", IEEE Computer Society, 2010 International Conference on Measuring Technology and Mechatronics Automation, Mar. 14, 2010, 5 pages.
International Search Report dated Oct. 4, 2018 issued in counterpart application No. PCT/KR2018/006723, 11 pages.
Chen Wang et al., "View Synthesis for Virtual Walk Through in Real Scene Based on Catadioptric Omnidirectional Images", International Conference on.
Cyberworlds 2008, XP 0314033649, Sep. 22, 2008, 7 pages.
Kim Hansung et al., "3D Scene Reconstruction from Multiple Spherical Stereo Pairs", International Journal of Computer Vision, XP035362202, Mar. 3, 2013, 23 pages.
European Search Report dated Nov. 21, 2019 issued in counterpart application No. 18817691.1-1210, 7 pages.

* cited by examiner

METHOD AND APPARATUS FOR PROCESSING OMNI-DIRECTIONAL IMAGE

CROSS-REFERENCE TO RELATED APPLICATION(S)

This application is based on and claims priority under 35 U.S.C. § 119 to U.S. Provisional Patent Application No. 62/520,192, filed on Jun. 15, 2017, in the United States Patent and Trademark Office, and to Korean Patent Application No. 10-2018-0003502, filed on Jan. 10, 2018, in the Korean Intellectual Property Office, the disclosure of each of which is incorporated by reference herein in its entirety.

BACKGROUND

1. Field

The present disclosure relates generally to a method and apparatus for processing an omni-directional image, and more particularly, to a method and apparatus for obtaining an omni-directional image having a new center from omni-directional images having different centers.

2. Description of Related Art

Along with technologies associated with virtual reality (VR) and/or augmented reality (AR), improvements have been made in processing and transmitting omni-directional images (e.g., three-dimensional (3D) images) for display in devices capable of providing VR or AR.

An omni-directional image may be generated from an image acquired by an omni-directional camera or a plurality of images acquired by a plurality of two-dimensional (2D) cameras. To provide a realistic VR experience to a user in response to movement of a VR device, a plurality of omni-directional images having different centers are provided and an omni-directional image selected from among a plurality of omni-directional images is provided in response to the user's movement.

Because it impossible to acquire omni-directional images by using a camera in all the possible positions, an omni-directional image centered in a region may not be acquired directly by a camera if the region is different from that of where the camera is arranged. Accordingly, an omni-directional image having a different center than the centers of previously acquired omni-directional images should be generated to provide a realistic VR experience to the user.

SUMMARY

Embodiments of the present disclosure are to address at least the above-mentioned problems and/or disadvantages and to provide at least the advantages described below.

According, an aspect of the disclosure is to provide a method and apparatus for generating an omni-directional image having a different center than those of already acquired omni-directional images.

In accordance with an aspect of the disclosure, a method is provided for processing information about an omni-directional image. The method includes generating a first two-dimensional (2D) image projected from a first omni-directional image, by setting points on the first omni-directional image, which intersect a straight line passing through a first position that is a center of the first omni-directional image and a second position that is a center of a second omni-directional image, to a first pole and a second pole, generating a second 2D image projected from the second omni-directional image, by setting points on the second omni-directional image, which intersect the straight line passing through the first position and the second position, to a third pole and a fourth pole, and generating a third 2D image corresponding to a 2D image projected from a third omni-directional image centered in a third position between the first position and the second position, based on the first 2D image and the second 2D image.

In accordance with another aspect of the disclosure, an apparatus is provided for processing information about an omni-directional image. The apparatus includes a communication interface and a processor electrically connected with the communication interface, in which the processor may generate a first 2D image projected from a first omni-directional image, by setting points on the first omni-directional image, which intersect a straight line passing through a first position that is a center of the first omni-directional image and a second position that is a center of a second omni-directional image, to a first pole and a second pole, to generate a second 2D image projected from the second omni-directional image, by setting points on the second omni-directional image, which intersect the straight line passing through the first position and the second position, to a third pole and a fourth pole, and to generate a third 2D image corresponding to a 2D image projected from a third omni-directional image centered in a third position between the first position and the second position, based on the first 2D image and the second 2D image.

BRIEF DESCRIPTION OF THE DRAWINGS

The above and other aspects, features and advantages of certain embodiments will be more apparent from the following description taken in conjunction with the accompanying drawings, in which.

DETAILED DESCRIPTION

Figure 1:
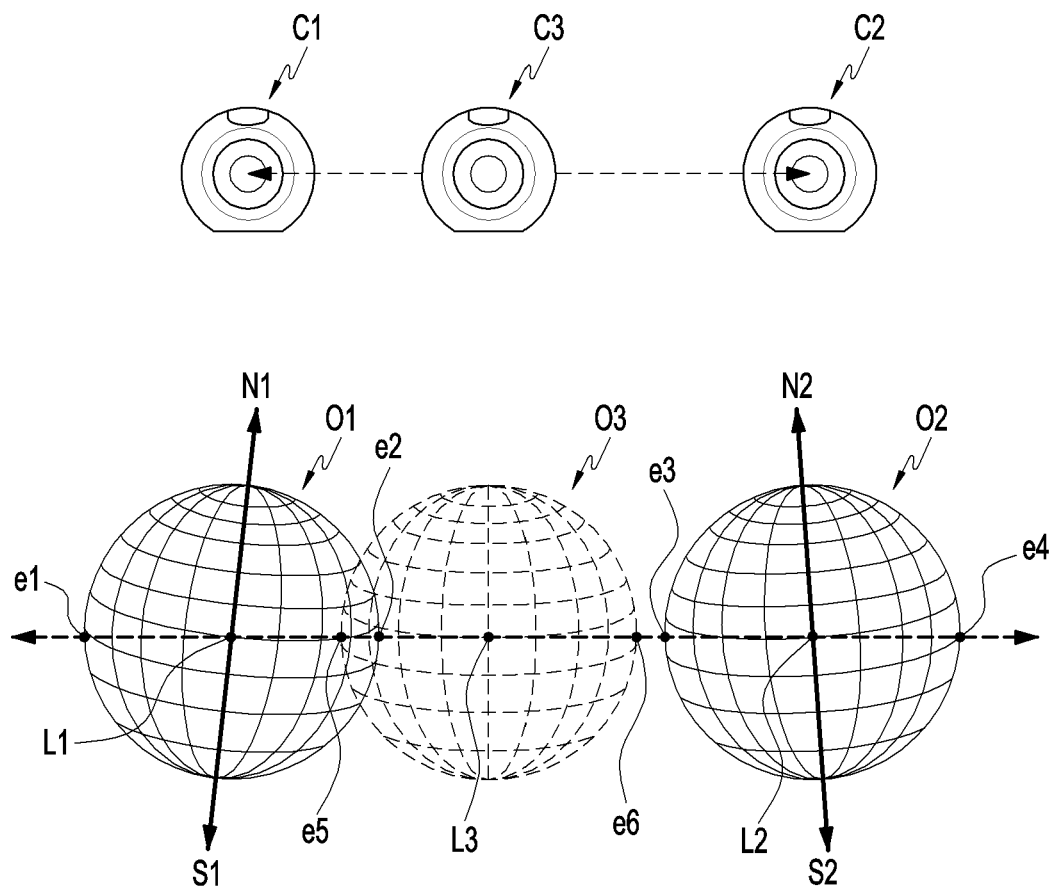
FIG. 1 illustrates cameras and omni-directional images corresponding thereto, according to an embodiment.

Embodiments of the present disclosure are described with reference to the accompanying drawings.

Similar reference numerals may be used to indicate similar components that perform substantially the same functions throughout the specification.

As used herein, terms such as "first" and "second" or "$1^{st}$" "$2^{nd}$" may be used to simply distinguish a corresponding component from another, and do not limit the components in other aspect (e.g., importance or order). Therefore, a first element mentioned below may be a second element, or vice versa, within the technical spirit of the disclosure.

FIG. 1 illustrates cameras and omni-directional images corresponding thereto, according to an embodiment.

Referring to FIG. 1, each of a first camera C1 and a second camera C2 may be an omni-directional camera or a set of a plurality of cameras. A first omni-directional image O1 may be captured and generated by the first camera C1. A second omni-directional image O2 may be captured and generated by the second camera C2. Each of the first omni-directional image O1 and the second omni-directional image O2 may be rendered in the shape of a sphere. A center L1 of the first omni-directional image O1 corresponds to a location of the first camera C1. A center L2 of the second omni-directional image O2 corresponds to a location of the second camera C2.

Points at which a straight line passing through the center L1 of the first omni-directional image O1 and the center L2 of the second omni-directional image O2 intersects the first omni-directional image O1 and the second omni-directional image O2 are referred to as epipoles (e.g., poles) e1, e2, e3, and e4.

Data regarding a third omni-directional image O3 is generated based on data regarding the first omni-directional image O1 and data regarding the second omni-directional image O2. The third omni-directional image O3 corresponds to an image acquired by a third camera C3. The third camera C3 may be a virtual camera. A center L3 of the third omni-directional image O3 corresponds to a location of the third camera C3. The center L3 of the third omni-directional image O3 is located between the center L1 of the first omni-directional image O1 and the center L2 of the second omni-directional image O2 on the straight line passing through the center L1 of the first omni-directional image O1 and the center L2 of the second omni-directional image O2.

An axis passing through a north pole N1 and a south pole S1 of the first omni-directional image O1 and an axis passing through a north pole N2 and a south pole S2 of the second omni-directional image O2 may not be parallel with each other. In this case, a two-dimensional 2D image projected from the first omni-directional image O1 in an ERP manner with respect to the north pole N1 and the south pole S1 of the first omni-directional image O1 and a 2D image projected from the second omni-directional image O2 in the ERP manner with respect to the north pole N2 and the south pole S2 of the second omni-directional image O2 may not be aligned with each other. Generating data regarding a third omni-directional image O3 from the non-aligned 2D images increases the complexity of processing, which increases a system load and, in turn, increases power consumption of the system.

Figure 2:
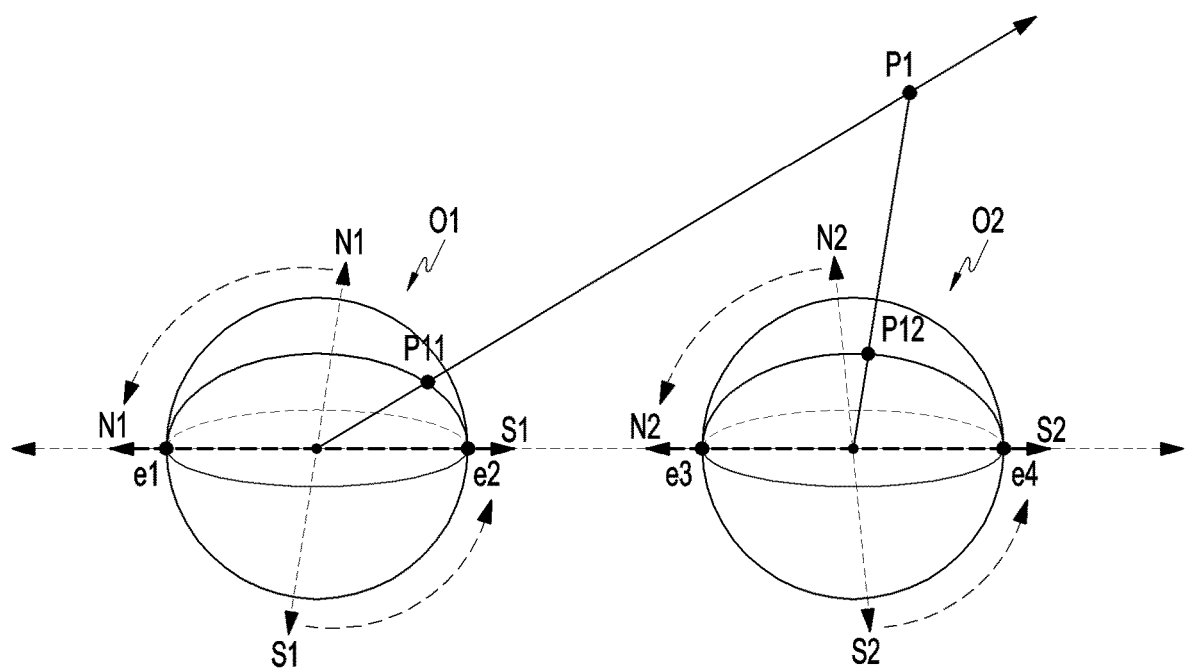
FIG. 2 illustrates positions of a particular point indicated on a first omni-directional image and a second omni-directional image, according to an embodiment.

FIG. 2 illustrates positions of a particular point indicated on a first omni-directional image and a second omni-directional image, according to an embodiment.

Referring to FIG. 2, the north poles N1 and N2 and the south poles S1 and S2 of the omni-directional images O1 and O2 may be adjusted (e.g., reset) to positions of the first through fourth epipoles e1, e2, and e3, and e4. More specifically, the north pole N1 and the south pole S1 of the first omni-directional image O1 may be set to the first epipole e1 and the second epipole e2, respectively, and the north pole N2 and the south pole S2 of the second omni-directional image O2 may be set to the third epipole e3 and the fourth epipole e4, respectively.

A first point P1 on a space may be indicated at a first position p11 on the first omni-directional image O1 and a second position p12 on the second omni-directional image O2. Based on the adjusted north poles N1 and N2 and south poles S1 and S2 of the first and second omni-directional images O1 and O2, the first position p11 and the second position p12 have the same longitude as each other. A position on the first omni-directional image O1 where an arbitrary point is the first point P1 on a space is indicated, and a position on the second omni-directional image O2 where an arbitrary point is indicated (e.g., P12) have the same longitude as each other.

Based on the adjusted north poles N1 and N2 and south poles S1 and S2 of the first and second omni-directional images O1 and O2, ERP projection may be performed with respect to the first and second omni-directional images O1 and O2.

Figure 3:
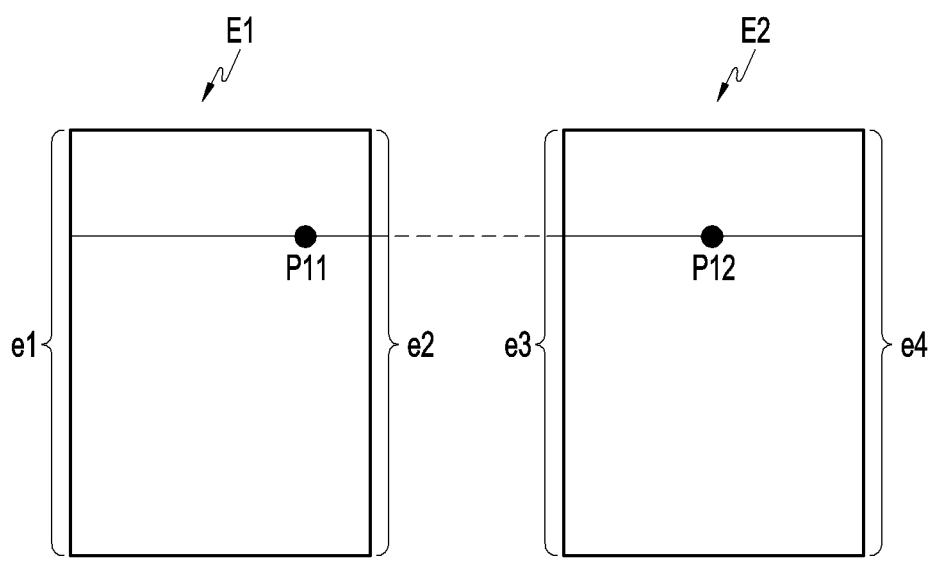
FIG. 3 illustrates first and second two-dimensional 2D images that are equirectangular projection (ERP)-projected from a first omni-directional image and a second omni-directional image, according to an embodiment.

FIG. 3 illustrates first and second 2D images that are ERP-projected from a first omni-directional image and a second omni-directional image, according to an embodiment.

Referring to FIG. 3, a first 2D image E1 and a second 2D image E2 are generated by being ERP-projected from the first omni-directional image O1 and the second omni-directional image O2, respectively. A left side and a right side of the first 2D image E1 correspond to the first epipole e1 and the second epipole e2, respectively. In an ERP-projection as illustrated in FIG. 2, a y coordinate of a particular position on a 2D image corresponds to a longitude of a corresponding position on an omni-directional image. An x coordinate of the particular position on the 2D image corresponds to an angle between the corresponding position on the omni-directional image and the north pole (e.g., an epipole) with respect to a center of the omni-directional image. Thus, the y coordinate of the first position p11 on the first 2D image E1 and the y coordinate of the second position p12 on the second 2D image E2 may be the same as each other. Likewise, the y coordinate of an arbitrary position on the first 2D image E1 and the y coordinate of a corresponding position on the second 2D image E2 may be the same as each other.

That is, according to FIGS. 2 and 3, corresponding positions on the 2D images E1 and E2 are aligned on the same y coordinates, simplifying a process for generating the data regarding the third omni-directional image O3 based on the 2D images E1 and E2.

Figure 4:
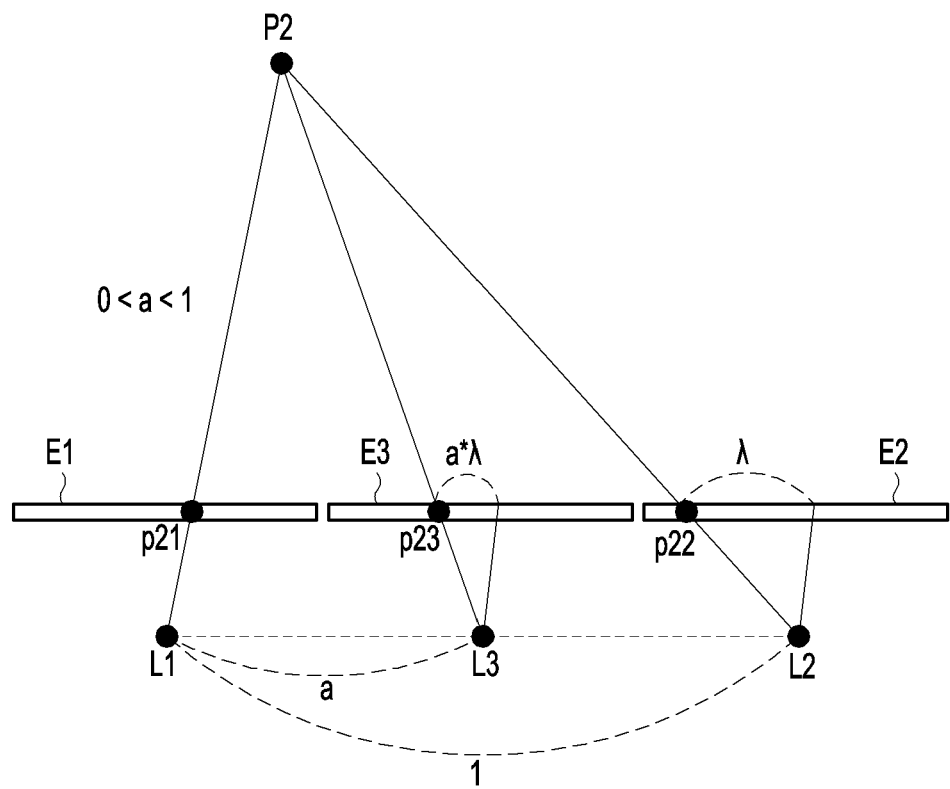
FIG. 4 illustrates a method for generating a third 2D image based on first and second 2D images, according to an embodiment.

FIG. 4 illustrates a method for generating a third 2D image based on first and second 2D images, according to an embodiment.

Referring to FIG. 4, a second point P2 on a space may be indicated at a third position p21 on the first 2D image E1 and a fourth position p22 on the second 2D image E2. The third 2D image E3 corresponds to an image that is ERP-projected from the third omni-directional image O3. The second point P2 may be indicated at a fifth position p23 on the third 2D image E3.

Y coordinates of the third position p21, the fourth position p22, and the fifth position p23 may be the same as one another as described above with reference to FIGS. 2 and 3.

A disparity value between an x coordinate of the third position p21 and an x coordinate of the fourth position p22 may be expressed with λ. That is, when the x coordinate of the third position p21 is x1 and the x coordinate of the fourth position p22 is x2, λ=x1−x2. When an x coordinate of the fifth position p23 is x3, x3=x1−(a)×λ. Accordingly, (a) indicates a ratio of a distance between the center L1 of the first omni-directional image O1 and the center L3 of the third omni-directional image O3 with respect to a distance between the center L1 of the first omni-directional image O1 and the center L2 of the second omni-directional image O2. By identifying positions on the third 2D image E3, which correspond to points on a space, in this way, the third 2D image E3 may be generated. The third 2D image E3 may correspond to a 2D image generated by setting points e5 and e6 (e.g., epipoles) on the third omni-directional image O3, which intersect the straight line passing through the center L1 of the first omni-directional image O1 and the center L2 of the second omni-directional image O2, to the north poles and the south poles and projecting the third omni-directional image O3 as an ERP.

Figure 5:
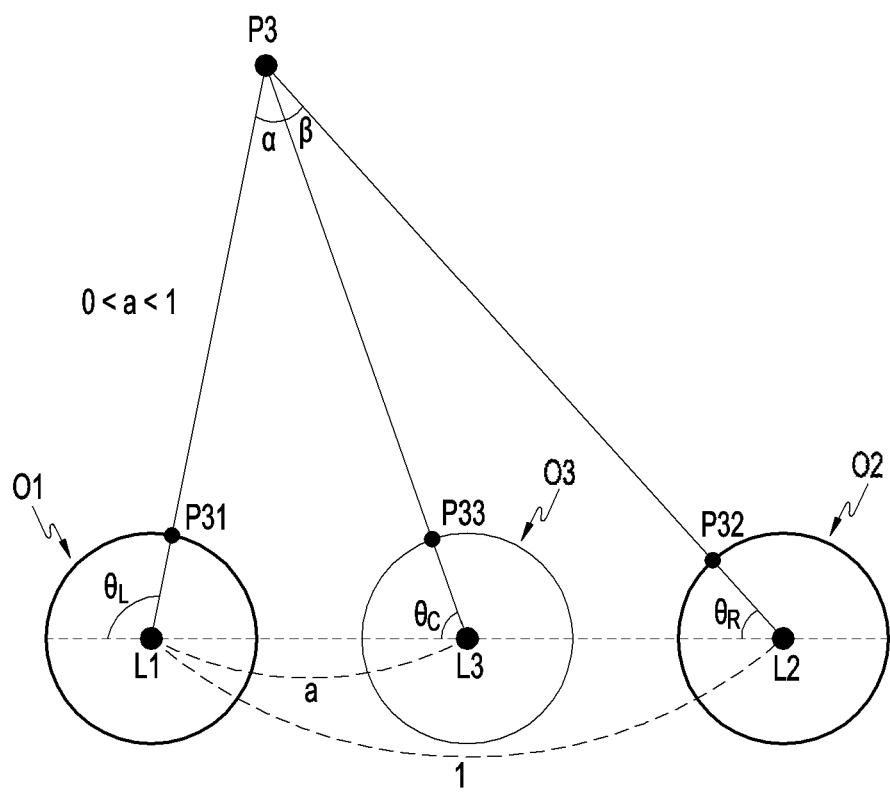
FIG. 5 illustrates a method for generating a third 2D image based on first and second 2D images, according to an embodiment.

FIG. 5 illustrates a method for generating a third 2D image based on first and second 2D images, according to an embodiment.

Referring to FIG. 5, a third point P3 on a space may be indicated at a sixth position p31 on the first omni-directional image O1, a seventh position p32 on the second omni-directional image O2, and an eighth position p33 on the third omni-directional image O3. An x coordinate of a position on an ERP-projected 2D image corresponding to a particular position on an omni-directional image corresponds to an angle between the north pole (e.g., an epipole) of the omni-directional image and the particular position on the omni-directional image with respect to the center of the omni-directional image. Thus, an x coordinate of the sixth position p31 on the first 2D image E1 corresponds to $\theta_L$. An x coordinate of the seventh position p32 on the second 2D image E2 corresponds to $\theta_R$. A disparity value between the x coordinate of the sixth position p31 on the first 2D image E1 and the x coordinate of the seventh position p32 on the second 2D image E2 may be expressed as $\theta_L-\theta_R$ which equals α+β. α is an angle from the third point P3 between the center L1 of the first omnidirectional image O1 and the center L3 of the third omnidirectional image O3 or an angle between the sixth position p31 and the eighth position p33. β is an angle from the third point P3 between the center L2 of the second omnidirectional image O2 and the center L3 of the third omnidirectional image O3 or an angle between the seventh position p32 and the eighth position p33.

An x coordinate of the eighth position p33 on the 2D image that is ERP-projected from the third omni-directional image O3 corresponds to $\theta_C$, where $\theta_C=\theta_L-\alpha$, Herein, α is given as shown in Equation (1) below.

$$\alpha = \tan^{-1}\left(\frac{\sin(\theta_L-\theta_R)}{\frac{(1-a)}{a\sin\theta_L}+\cos(\theta_L-\theta_R)}\right) \quad (1)$$

Y coordinates of the sixth position p31, the seventh position p32, and the eighth position p33 on the 2D image may be the same as one another.

By identifying positions on the 2D image ERP-projected from the third omni-directional image O3, which correspond to points on a space, in this way, the 2D image may be generated by setting the epipoles e5 and e6 to the north poles and the south poles and projecting the third omni-directional image O3 in the ERP manner.

Figure 6:
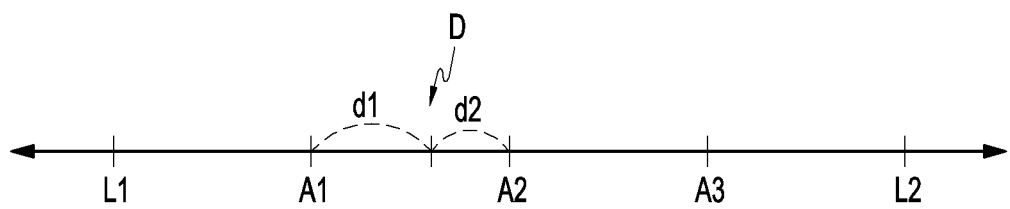
FIG. 6 illustrates a method for setting a center of a third omni-directional image, according to an embodiment.

FIG. 6 illustrates a method for setting a center of a third omni-directional image, according to an embodiment.

Referring to FIG. 6, the center L3 of the third omni-directional image O3 may be selected from among quantized positions A1, A2, and A3 between the center L1 of the first omni-directional image O1 and the center L2 of the second omni-directional image O2 on the straight line passing through the center L1 of the first omni-directional image O1 and the center L2 of the second omni-directional image O2. The number of quantized positions may be set differently according to embodiments. Intervals between the center L1 of the first omni-directional image O1, the center L2 of the second omni-directional image O2, and the plurality of quantized positions A1, A2, and A3 may be set uniformly, but the disclosure is not limited thereto.

In various embodiments, among the plurality of quantized positions A1, A2, and A3, a position closest to a device D for displaying an omni-directional image or a user of the device D may be set as the center L3 of the third omni-directional image O3.

The second quantized position A2 may be set as the center L3 of the third omni-directional image O3. When each distance between each of the plurality of quantized positions A1, A2, and A3 and the device D for displaying an omni-directional image or the user of the device D is larger than the distance between the center L1 of the first omni-directional image O1 and the device D for displaying an omni-directional image, or larger than the distance between the center L1 of the first omni-directional image O1 and the user of the device D, an image corresponding to the first omni-directional image O1 may be displayed in the device D for displaying an omni-directional image. The third omni-directional image O3 may not be generated or may not be delivered to the device D for displaying an omni-directional image.

When the device D or the user thereof, is moving, a ratio of a distance between the closest quantized position among the plurality of quantized positions A1, A2, and A3 and the device D with respect to a distance between a center of an omni-directional image currently displayed on the device D and the device D is less than or equal to a threshold value, the device D displays an omni-directional image centered in the closest quantized position.

Accordingly, an apparatus (e.g., a server) for transmitting data regarding an omni-directional image generates data regarding an omni-directional image centered in the closest quantized position and transmits the generated data to the device D.

Referring to FIG. 6, when an omni-directional image centered in the first quantized position A1 is currently displayed on the device D, a ratio of a distance d2 between the device D and the second quantized position A2 with respect to a distance d1 between the device D and the first quantized position A1 is less than or equal to a threshold value, the device D displays an omni-directional image centered in the second quantized position A2.

An apparatus for transmitting data regarding an omni-directional image previously generates and stores data regarding an omni-directional image centered in each of the plurality of quantized positions A1, A2, and A3, and transmits, to the device D, data regarding the omni-directional image, which is selected due to a need from among previously generated and stored data regarding a plurality of omni-directional images.

The device D stores the data regarding the omni-directional image centered in each of the plurality of quantized positions A1, A2, and A3, retrieves the data regarding the omni-directional image, which is selected due to a need from among the previously stored data regarding the plurality of omni-directional images, and displays the selected omni-directional image.

Figure 7:
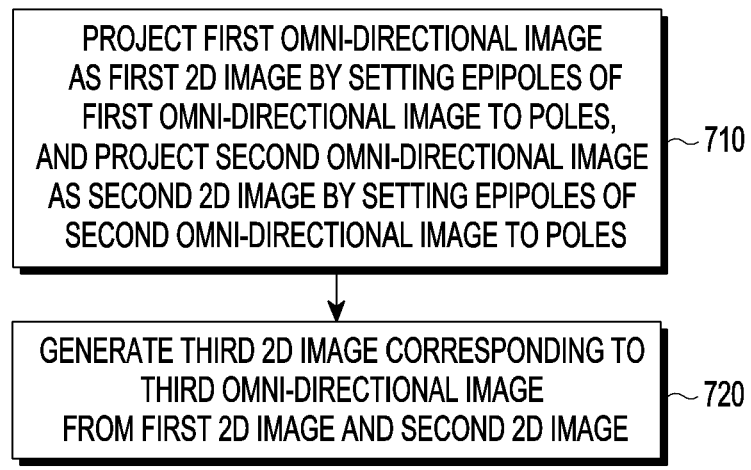
FIG. 7 is a flowchart illustrating a method for processing an omni-directional image, according to an embodiment.

FIG. 7 is a flowchart illustrating a method for processing an omni-directional image, according to an embodiment.

Referring to FIG. 7, in step 710, a first omni-directional image is projected as a first 2D image by setting epipoles of the first omni-directional image to poles, and a second omni-directional image is projected as a 2D image by setting epipoles of the second omni-directional image to poles. Detailed operations of step 710 are similar as described with reference FIGS. 2 and 3.

In step 720, a third 2D image corresponding to a third omni-directional image is generated from the first 2D image and the second 2D image. Detailed operations of step 720 may be the operations described with reference to FIG. 4 or the operations described with reference to FIG. 5.

Steps 710 and 720 may be performed by an apparatus (e.g., a server) for transmitting data regarding an omni-directional image. In various embodiments, steps 710 and 720 may be performed by an apparatus (e.g., a VR device) for displaying data regarding an omni-directional image.

Figure 8:
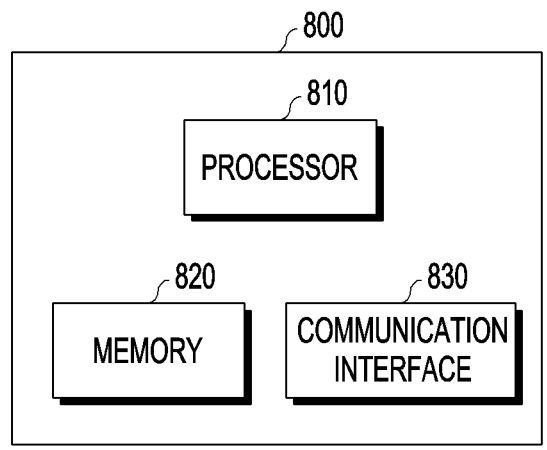
FIG. 8 is a block diagram of an apparatus for processing an omni-directional image, according to an embodiment.

FIG. 8 is a block diagram of an apparatus for processing an omni-directional image, according to an embodiment.

Referring to FIG. 8, an apparatus 800 for processing an omni-directional image may be an apparatus for transmitting data regarding an omni-directional image (e.g., a server). The apparatus 800 generates data regarding the third omni-directional image O3 and transmits the generated data using the above-described methods. The data regarding third omni-directional image O3 is based on a 2D image corresponding to a 2D image that is ERP-projected from the third omni-directional image O3. The apparatus 800 may transmit data regarding the 2D image corresponding to the 2D image that is ERP-projected from the third omni-directional image O3 by using a protocol such as the Moving Picture Experts Group (MPEG).

For convenience of a display in a receiving side, the apparatus 800 converts the generated 2D image into a 2D image corresponding to a 2D image that is ERP-projected based on the different poles of the third omni-directional image O3. Transmission of the data regarding the 2D image may be based on the converted 2D image. In various embodiments, packing according to region (e.g., region-wise) may be performed on the 2D image. Region-wise packing means dividing the 2D image into a plurality of regions and performing transformation, rotation, re-sampling, or re-arrangement with respect to each of the plurality of regions.

The apparatus 800 includes a processor 810, a memory 820, and a communication interface 830. The processor 810 substantially performs and controls operations performed in the apparatus 800. The processor 810 is electrically connected with the memory 820 and the communication interface 830 for communication, and controls operations of the memory 820 and the communication interface 830. Thus, operations performed directly by the memory 820 or the communication interface 830 may be interpreted as being substantially performed by the processor 810. The memory 820 transitorily or non-transitorily stores data needed for operations of the apparatus 800 or the processor 810. The memory 820 stores instructions or codes that are executable by the processor 810. The communication interface 830 may be configured to transmit and/or receive data.

Figure 9:
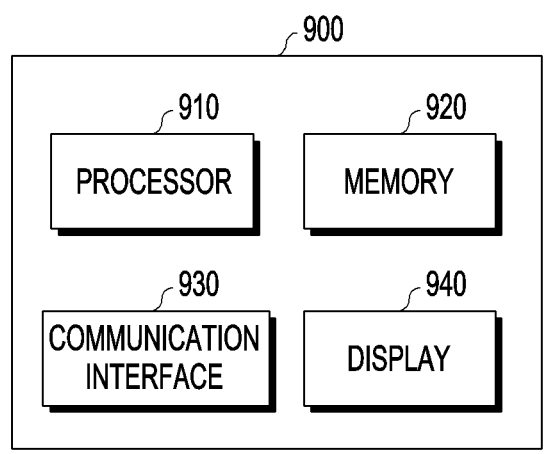
FIG. 9 is a block diagram of an apparatus for processing an omni-directional image, according to an embodiment.

FIG. 9 is a block diagram of an apparatus for processing an omni-directional image, according to an embodiment.

Referring to FIG. 9, an apparatus 900 may be an apparatus for displaying an omni-directional image (e.g., a VR device). The apparatus 900 receives data regarding an omni-directional image and displays the received data. For example, the apparatus may receive data regarding the third omni-directional image O3 based on an image corresponding to an image that is ERP-projected from the third omni-directional image O3 generated by the above-described methods, and display at least a part of the third omni-directional image O3 based on the received data.

The apparatus 900 receives data regarding the first omni-directional image O1 and data regarding the second omni-directional image O2. The data regarding the first omni-directional image O1 may be data regarding the first 2D image E1, and the data regarding the second omni-directional image O2 may be data regarding the second 2D image E2. The apparatus 900 generates data regarding a 2D image corresponding to an image that is ERP-projected from the third omni-directional image O3 by using the above-described methods based on the data regarding the first 2D image E1 and the data regarding the second 2D image E2. The apparatus 900 displays at least a part of the third omni-directional image O3 based on the generated data regarding the 2D image.

The apparatus 900 includes a processor 910, a memory 920, a communication interface 930, and a display 940. A description of the processor 910, the memory 920, and the communication interface 930 is substantially similar to that of the processor 810, the memory 820, and the communication interface 830 of the apparatus 800 of FIG. 8. The display 940 displays an image under control of the processor 910.

Accordingly, embodiments of the disclosure provide, at least, a method and apparatus for generating an omni-directional image having a different center than those of existing omni-directional images. Additionally, the method and apparatus provided may reduce a computational load necessary for processing omni-directional images.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method for processing information about an omni-directional image, the method comprising:

generating, by a processor of an apparatus, a first two-dimensional (2D) image projected from a first omni-directional image, by setting points on the first omni-directional image, which intersect a straight line passing through a first position that is a center of the first omni-directional image and a second position that is a center of a second omni-directional image, to a first pole and a second pole;

generating, by the processor, a second 2D image projected from the second omni-directional image, by setting points on the second omni-directional image, which intersect the straight line passing through the first position and the second position, to a third pole and a fourth pole; and generating, by the processor, a third 2D image corresponding to a 2D image projected from a third omni-directional image centered in a third position between the first position and the second position, based on the first 2D image and the second 2D image.

2. The method of claim 1, wherein generating the third 2D image further comprises identifying third coordinates of a fourth position on the third 2D image, which correspond to first coordinates of the fourth position on the first 2D image and second coordinates of the fourth position on the second 2D image, and wherein the first coordinates, the second coordinates, and the third coordinates have the same y coordinate, and are defined as follows:

$$\theta_C = \theta_L - \alpha,$$

$$\alpha = \tan^{-1}\left(\frac{\sin(\theta_L - \theta_R)}{\frac{(1-a)}{a\sin\theta_L} + \cos(\theta_L - \theta_R)}\right),$$

and
wherein:
$\theta_C$ indicates an x coordinate of the third coordinates,
$\theta_L$ indicates an x coordinate of the first coordinates,
$\theta_R$ indicates an x coordinate of the second coordinates, and
a indicates a ratio of a distance between the first position and the third position with respect to a distance between the first position and the second position.

3. The method of claim 1, wherein generating the third 2D image further comprises identifying third coordinates of a fourth position on the third 2D image, which correspond to first coordinates of the fourth position on the first 2D image and second coordinates of the fourth position on the second 2D image, wherein the first coordinates, the second coordinates, and the third coordinates have the same y coordinate, and are defined as follows:

$x3 = x1 - a*(x1-x2)$, and wherein:
x1 indicates an x coordinate of the first coordinates,
x2 indicates an x coordinate of the second coordinates,
x3 indicates an x coordinate of the third coordinates, and
a indicates a ratio of a distance between the first position and the third position with respect to a distance between the first position and the second position.

4. The method of claim 1, further comprising converting the third 2D image into a fourth 2D image, wherein the third 2D image corresponds to a 2D image projected by setting points on the third omni-directional image, which intersect the straight line passing through the first position and the second position, to a fifth pole and a sixth pole, and wherein the fourth 2D image corresponds to a 2D image projected from the third omni-directional image based on poles that are different from the fifth pole and the sixth pole.

5. The method of claim 1, further comprising transmitting, by the processor, information about the third omni-directional image based on the third 2D image.

6. The method of claim 1, wherein each of the first omni-directional image, the second omni-directional image, and the third omni-directional image are respectively rendered in a spherical shape by the processor.

7. The method of claim 1, wherein the first 2D image and the second 2D image are projected from the first omni-directional image and the second omni-directional image, respectively, in an equirectangular projection (ERP) manner, and wherein the third 2D image corresponds to a 2D image projected from the third omni-directional image in the ERP manner by setting points on the third omni-directional image, which intersect the straight line, to a fifth pole and a sixth pole.

8. The method of claim 1, wherein the first omni-directional image is acquired by a first camera located in the first position, and the second omni-directional image is acquired by a second camera located in the second position.

9. The method of claim 1, wherein the third position includes one of a plurality of quantized positions on the straight line between the first position and the second position.

10. The method of claim 9, wherein the third position includes a position closest to a device for displaying the third omni-directional image among the plurality of quantized positions.

11. An apparatus for processing information about an omni-directional image, the apparatus comprising:
a communication interface; and
a processor configured to:
generate a first two-dimensional (2D) image projected from a first omni-directional image, by setting points on the first omni-directional image, which intersect a straight line passing through a first position that is a center of the first omni-directional image and a second position that is a center of a second omni-directional image, to a first pole and a second pole;
generate a second 2D image projected from the second omni-directional image, by setting points on the second omni-directional image, which intersect the straight line passing through the first position and the second position, to a third pole and a fourth pole; and
generate a third 2D image corresponding to a 2D image projected from a third omni-directional image centered in a third position between the first position and the second position, based on the first 2D image and the second 2D image.

12. The apparatus of claim 11, wherein the processor is further configured to identify third coordinates of a fourth position on the third 2D image, which correspond to first coordinates of the fourth position on the first 2D image and second coordinates of the fourth position on the second 2D image, wherein the first coordinates, the second coordinates, and the third coordinates have the same y coordinate, and are defined as follows:

$$\theta_C = \theta_L - \alpha,$$

$$\alpha = \tan^{-1}\left(\frac{\sin(\theta_L - \theta_R)}{\frac{(1-a)}{a\sin\theta_L} + \cos(\theta_L - \theta_R)}\right),$$

and
wherein:
$\theta_C$ indicates an x coordinate of the third coordinates,
$\theta_L$ indicates an x coordinate of the first coordinates,
$\theta_R$ indicates an x coordinate of the second coordinates, and
a indicates a ratio of a distance between the first position and the third position with respect to a distance between the first position and the second position.

13. The apparatus of claim 11, wherein the processor is further configured to identify third coordinates of a fourth position on the third 2D image, which correspond to first coordinates of the fourth position on the first 2D image and second coordinates of the fourth position on the second 2D image, wherein the first coordinates, the second coordinates, and the third coordinates have the same y coordinate, and are defined as follows:

$x3=x1-a*(x1-x2)$, and wherein:
- x1 indicates an x coordinate of the first coordinates,
- x2 indicates an x coordinate of the second coordinates,
- x3 indicates an x coordinate of the third coordinates, and
- a indicates a ratio of a distance between the first position and the third position with respect to a distance between the first position and the second position.

14. The apparatus of claim 11, wherein the processor is further configured to convert the third 2D image into a fourth 2D image, wherein the third 2D image corresponds to a 2D image projected by setting points on the third omni-directional image, which intersect the straight line passing through the first position and the second position, to a fifth pole and a sixth pole, and wherein the fourth 2D image corresponds to a 2D image projected from the third omni-directional image based on poles that are different from the fifth pole and the sixth pole.

15. The apparatus of claim 11, wherein the processor is further configured to transmit information about the third omni-directional image based on the third 2D image.

16. The apparatus of claim 11, wherein each of the first omni-directional image, the second omni-directional image, and the third omni-directional image are respectively rendered in a spherical shape.

17. The apparatus of claim 11, wherein the first 2D image and the second 2D image are projected from the first omni-directional image and the second omni-directional image, respectively, in an equirectangular projection (ERP) manner, and wherein the third 2D image corresponds to a 2D image projected from the third omni-directional image in the ERP manner by setting points on the third omni-directional image, which intersect the straight line, to a fifth pole and a sixth pole.

18. The apparatus of claim 11, wherein the first omni-directional image is acquired by a first camera located in the first position, and the second omni-directional image is acquired by a second camera located in the second position.

19. The apparatus of claim 11, wherein the third position includes one of a plurality of quantized positions on the straight line between the first position and the second position.

20. The apparatus of claim 19, wherein the third position includes a position closest to a device for displaying the third omni-directional image among the plurality of quantized positions.

* * * * *